(12) United States Patent
DeBlieck

(10) Patent No.: US 9,816,626 B1
(45) Date of Patent: Nov. 14, 2017

(54) METHOD AND DEVICE FOR ADAPTING AN ACTUATOR TO A VALVE

(71) Applicant: Davis & Davis Company, Englewood, CO (US)

(72) Inventor: Dennis DeBlieck, Littleton, CO (US)

(73) Assignee: Davis & Davis Company, Englewood, CO (US)

( * ) Notice: Subject to any disclaimer, the term of this patent is extended or adjusted under 35 U.S.C. 154(b) by 105 days.

(21) Appl. No.: 14/800,213

(22) Filed: Jul. 15, 2015

Related U.S. Application Data

(60) Provisional application No. 62/024,737, filed on Jul. 15, 2014.

(51) Int. Cl.
*F16K 11/044* (2006.01)
*F16K 37/00* (2006.01)
*F16K 27/02* (2006.01)

(52) U.S. Cl.
CPC ........ *F16K 11/044* (2013.01); *F16K 27/0263* (2013.01); *F16K 37/0016* (2013.01)

(58) Field of Classification Search
CPC .................................................... F16K 31/047
USPC .................. 137/556, 556.6, 625.19, 625.48; 251/321–323, 337
See application file for complete search history.

(56) References Cited

U.S. PATENT DOCUMENTS

| | | | | |
|---|---|---|---|---|
| 923,422 A | * | 6/1909 | Dunham | F01L 3/10 123/90.52 |
| 1,254,460 A | * | 1/1918 | Zobell | F16K 27/003 137/271 |
| 4,235,258 A | * | 11/1980 | Uno | F16K 37/0008 137/556 |
| 4,836,497 A | * | 6/1989 | Beeson | F16K 31/04 137/315.03 |
| 5,738,142 A | | 4/1998 | Eike et al. | |
| 6,109,302 A | | 8/2000 | Bircann | |
| 6,474,362 B1 | | 11/2002 | Hope et al. | |
| 6,609,533 B2 | * | 8/2003 | Sundararajan | F16K 31/122 137/14 |
| 6,636,811 B1 | | 10/2003 | Walte et al. | |
| 6,659,184 B1 | | 12/2003 | Tips et al. | |
| 6,945,507 B2 | | 9/2005 | Baarda et al. | |

(Continued)

OTHER PUBLICATIONS

"H10/H25 Hydramotor, Fail-Safe Electrohydraulic Linear Actuators," ASCO Valve, Inc., 2014, 4 pages.

(Continued)

*Primary Examiner* — Craig Schneider
*Assistant Examiner* — Angelisa L Hicks
(74) *Attorney, Agent, or Firm* — Sheridan Ross P.C.

(57) ABSTRACT

A new valve assembly is provided that includes an actuator, a housing assembly, and a valve for diverting the flow of liquids through pipelines. Embodiments of the present invention include a yoke with transparent windows, a long valve stem, a bushing nut, an actuator shaft, a jam nut, a stem nut, a union nut to interconnect the valve stem to the actuator output shaft, a position indicator, an indicator plate, and a valve mounting bonnet and lock ring to interconnect the yoke to the valve. The housing assembly includes components to interconnect the actuator output shaft to the valve stem that reduce the side-to-side movement of the actuator output shaft, which in turn reduces the failure rate of the valve assembly.

19 Claims, 6 Drawing Sheets

(56) References Cited

U.S. PATENT DOCUMENTS

| | | | |
|---|---|---|---|
| 8,636,835 | B2 | 1/2014 | Carew |
| 8,709,825 | B2 | 4/2014 | Durack et al. |
| 8,714,269 | B2 | 5/2014 | Brennan, III |
| 8,726,985 | B2 | 5/2014 | Hessels et al. |
| 8,733,308 | B2 | 5/2014 | Racklebe et al. |
| 2008/0072975 | A1 | 3/2008 | Sugiura |
| 2010/0270485 | A1* | 10/2010 | Lovgren ............... F16K 31/047 251/129.11 |
| 2014/0053548 | A1 | 2/2014 | Peters |
| 2014/0054031 | A1 | 2/2014 | Heijnen |
| 2014/0083512 | A1 | 3/2014 | Chism et al. |
| 2014/0102796 | A1 | 4/2014 | Veneruso et al. |
| 2014/0110243 | A1 | 4/2014 | Lah |
| 2014/0151343 | A1 | 6/2014 | Foret |
| 2014/0158220 | A1 | 6/2014 | Schneider et al. |

OTHER PUBLICATIONS

"H30/H35 Hydramotor, Fail-Safe Electrohydraulic Linear Actuators," ASCO Valve, Inc., 2014, 4 pages.
"3-Way Two-Position Hydramotor Valve H11V734 Series," Barton, 2014, 3 pages.
"304 Series_Three-Way, Two Position Valve," Pathway Control Products, Inc., 2014, 1 page.
"Model 304-335-121, 3A-150# Flanged, Delpin Plus," Liquid Level Lectronics, Inc., Mar. 31, 1981, 1 page.

* cited by examiner

METHOD AND DEVICE FOR ADAPTING AN ACTUATOR TO A VALVE

CROSS REFERENCE TO RELATED APPLICATIONS

This application claims priority from U.S. Provisional Patent Application Ser. No. 62/024,737, filed Jul. 15, 2014, entitled "Method and Device for Adapting an Actuator to a Valve"; the entire disclosure of which is hereby expressly incorporated by reference in its entirety.

FIELD OF THE INVENTION

Embodiments of the present invention generally relate to motor-driven valve assemblies, and more specifically to actuator-driven valve assemblies used in the oil and gas industry.

BACKGROUND OF THE INVENTION

Valve assemblies are used in the oil and gas industries to divert the flow of oil or gas to various locations, e.g., to a well test, storage tank, and the treating facility. However, prior art valve assemblies were prone to failure because the actuator shaft (also called an "actuator output shaft" herein) would move from side-to-side in all directions (360°). This movement wears down the parts and eventually leads to failure. Additionally, the prior art designs would often come unscrewed, which also lead to failure of the valve assembly.

Accordingly, there exists a significant need for a valve assembly with little to no movement of the actuator shaft in a side-to-side direction. Further, there is a need for a valve assembly used in the oil and gas industry with components that will not come unscrewed after the valve assembly is placed in the oil or gas line.

Due to the numerous limitations associated with the prior art described above, the following disclosure describes an improved valve assembly that employs an adapter device that is reliable and that adapts the actuator to the valve. The novel features of the valve assembly described herein provide a more reliable valve assembly that is not prone to failure once it is placed in the oil and gas line.

SUMMARY OF THE INVENTION

These and other needs are addressed by the various embodiments and configurations of the present invention. This invention relates to a novel system, device, and method for providing a valve assembly with a housing assembly and an adapter to interconnect the valve to the actuator.

It is thus one aspect of various embodiments of the present invention to provide a device to adapt a motor to a valve in a valve assembly that can operate at higher operating pressures than adapters of the prior art. More specifically, the motor can be an actuator and the valve can be a two-way or a three-way valve. One advantage of some embodiments is that the valve is easier to assemble and disassemble from the actuator.

One advantage of some embodiments is that the valve-actuator adapter provides standard, uniform spring pre-load and compression.

One aspect of embodiments of the present invention is to provide an actuator output shaft connection between an actuator and a valve that reduces the side thrust on the shaft and prolongs the life of the packing gland in the valve. Thus, in some embodiments the actuator shaft connection is closer to the valve than connections of the prior art.

It is another aspect of embodiments of the present invention to provide a device to adapt an actuator to a valve used in oil and gas fields that reduces rotation of the valve stem and plug assembly. Reducing the rotation prevents the assembly from spinning and coming apart, specifically reducing the rotation prevents the shaft and actuator from coming apart from the valve stem under high flow conditions.

One aspect of embodiments of the present invention is to provide a device to adapt an actuator to a valve that is more resistant to high vibration applications, which are common in oil and gas drilling applications.

Another aspect of embodiments of the present invention is to provide a device to adapt an actuator to a valve that is more robust than prior art designs. Specifically, in embodiments of the present invention, the connection point between the actuator output shaft and the valve is positioned closer to the valve than prior art designs because the farther away connection point of prior art designs was often the weak point of the adapter assembly. Further, in some embodiments the connection point comprises a union nut and/or a stem nut.

In some embodiments of the present invention, the valve assembly includes a valve, an adapter assembly, and an actuator. Various actuators can be used, such as linear actuators, rotary actuators, electro-hydraulic actuators, and any other actuator known in the art that can operate the valve. Additionally, various adapter assemblies can also be used, such as housings to protect the actuator output shaft, the valve stem, and the adaptor that adapts the valve stem to the actuator output shaft. The adaptor assembly includes a union nut connection and removable cage for ease of servicing in some embodiments. Further, various valves can be used, such as three-way, two position, normally closed upper port units. In one embodiment of the present invention, the valve assembly includes a valve with a uniquely designed body that enables the internal parts to be removed through the top of the valve without having to remove the valve from the line. In some embodiments, the valve has a cast iron body with a static pressure rating of 400 psi for liquids and fluids. The lower valve seat can be machined in the body and the upper seat can be formed on the lower portion of the integral valve cage. Further embodiments can use a poppet type valve plug with a Buna N seat disc to ensure a tight shutoff.

In various embodiments, the components of the valve assembly are contained within a water-tight, explosion-proof enclosure.

In various embodiments, the valve may be a pressure-holding directional control valve. In one embodiment of the present invention, the valve is a two-position, three-way directional control valve that prevents reverse flow from an actuator port to a pressure port in one position, such as the valve described in U.S. Pat. No. 5,738,142 to Eike et al., which is incorporated by reference herein in its entirety. In some embodiments, the valve is solenoid-actuated and is spring-biased to a drain position, where an extension central to a spool assembly penetrates through a check valve seat and lifts a check valve ball from its seat to permit flow from an actuator port to a drain port. In the actuated or energized position, an armature assembly is shifted by a solenoid, drawing the spool assembly within the valve body and establishing a fluid path between a pressure port and the actuator port. In this position the extension of the spool assembly is withdrawn from the check valve seat. The check valve can be unseated by pressure from the pressure port to permit flow from the pressure port, through the spool and the check valve assembly. In the event of loss of pressure from the pressure port, such as due to shifting of other valves coupled to a pressure source, the check valve reseats to prevent reverse flow from the actuator port to the pressure port. The valve assembly is preferably configured as a cartridge valve for use in pre-drilled manifolds.

In another embodiment, the valve can be a three-way valve for selectively controlling a flow of oil and/or gas between one passage and at least one of two additional passages, such as the valve described in U.S. Pat. No. 6,109,302 to Bircann, which is incorporated by reference herein in its entirety. The valve assembly has a body including a lower chamber communicating with first and second oppositely disposed controlled ports having first and second opposed valve seats aligned on an axis. A third inlet/outlet port also communicates with the lower chamber. A valve member in the body includes a shaft that is reciprocally movable on the axis and carries at least one head with first and second axially spaced seat engaging surfaces that are, respectively, alternately engagable with the valve seats for closing their respective ports. A biasing spring urges the valve member in a first direction for closing the first port and opening the second port. An actuator includes an armature that operatively engages the shaft for moving the valve member in a second direction for opening the first port and closing the second port. A floating bearing, located at one side of the body, supports the valve member shaft and the valve head or heads in overhung fashion. The actuator is detached from the shaft so that alignment of the valve seat engaging surfaces with their respective seats is not affected by engagement of the shaft with the actuator. The valve head or heads may be fixed or swively mounted on the shaft for positive seating on their seats.

In some embodiments of the present invention, the valve assembly comprises a gas flow controller with a control valve coupled for actuating a main valve, similar to the device described in U.S. Patent Application Publication No. 2004/0056221 to Baarda, et al., which is incorporated by reference herein in its entirety. In one example embodiment, a gas flow controller includes a main valve and a servo valve operated by an actuator, the servo valve being used for controlling the opening of the main valve. The servo valve is implemented in a variety of manners, such as a three-way valve or as a double two-way valve. The servo valve further communicates, via gas pipes, with a first gas chamber limited by a diaphragm in operative connection with the main valve, as well as to a second gas chamber in the inlet area, and a third gas chamber in the outlet area.

In various embodiments of the present invention, the valve assembly includes an actuator, which may be of any suitable type, such as a solenoid actuator including an armature that is movable in a housing along a generally vertical axis. In another embodiment, the valve assembly is composed of a three-way valve and an electromagnetic actuator. The three-way valve and a valve shaft are disposed in an elongated valve housing, and the three-way valve is operated by the valve shaft, which is driven by the electromagnetic actuator. Similar valve assemblies can also be used, such as those described in U.S. Patent Application Publication No. 2008/0072975 to Sugiura, which is incorporated by reference herein in its entirety.

In other embodiments, the actuator is an actuator similar to the Hydramotor fail-safe electrohydraulic linear actuators. For example, the actuator may be an electrohydraulic, linear actuator with a completely self-contained, sealed, hydraulic motor/pump power unit coupled to a hydraulic cylinder containing both the piston/shaft assembly and return-spring. The electrohydraulic actuator reduces installation costs, eliminates complicated linkage, gearing, reductions, or other attached mechanisms. The actuators can also be positive, firm-positioning actuators, which are ideal for providing efficient, precise, reliable linear control of valves requiring an operating thrust of up to 2600 lbs and an output shaft extension of up to 2.625 in. The actuator can be either a push-power-stroke actuator or a pull-power-stroke actuator and can be either spring-return or lock-in-last position upon loss of power. The push-type actuator typically has a power stroke in the extended direction and a spring return stroke, with power off, in the retracting direction. The actuator can include a two-wire control circuit to control the actuator and valve. The spring-return provides "fail-safe" operation, i.e., a spring within the cylinder returns the actuator shaft to its deenergized position upon power interruption. Whereas a valve with a lock-in-last position allows the user to independently control the spring-return of the actuator shaft to its deenergized position after a loss of power supply.

In some embodiments of the present invention, the actuator is an enamel-finished die-cast aluminum exterior housing and has corrosion-resistant steel output shaft components in order to perform reliably in the most demanding, rugged, and hostile industrial environments, including oil and gas drilling operations. For example, the valve and actuator must operate at temperatures between −40° F. and 150° F. In some embodiments, the pump is a single-piston, positive displacement with an integral check valve. Further, the actuator can be a sealed power unit, which requires no maintenance or servicing. The actuator can also include a two-wire control circuit, which is safe, reliable, and simplifies tie-ins to other parts of the system. In one embodiment, the valve is manufactured by Pathway Controls. In an additional or alternative embodiment, the actuator is manufactured by ASCO Valve, Inc.

In one embodiment, the valve assembly has a bushing (also called a bushing nut herein) instead of an adapter, which was used in prior art versions of the present invention. Further, in some embodiments, the valve assembly includes a longer valve stem and a different extension shaft (also called a "connector shaft" or "actuator extension shaft" herein or referred to as a portion of the actuator shaft) than was used in prior art versions of the present invention. In one embodiment, the valve assembly also includes a jam nut to keep the bushing nut screwed onto the valve stem. The adapter in prior art versions had a tendency to come unscrewed from the valve stem. In some embodiments, the actuator output shaft is longer such that a connector shaft is not needed.

In one embodiment, a valve assembly for use in the oil and gas industry is provided comprising: an actuator with an actuator output shaft; a valve with a valve stem extending outwardly from an opening in an upper portion of the valve; and a housing assembly interconnected on a lower end to the upper portion of the valve and interconnected on an upper end to a lower portion of the actuator, where the housing assembly comprises: a yoke; a spring having an outer diameter; a plate including a bore positioned proximate a center of the plate, where the plate has an outer diameter that is larger than the outer diameter of the spring; a bushing interconnected to the valve stem, the bushing having an upper portion positioned above the plate and having a lower portion, where at least a portion of the lower portion of the bushing is positioned within the bore of the plate; a shaft having an upper end, a lower end, and a body, where an outer diameter of the body is larger than an outer diameter of the actuator output shaft and a diameter of the valve stem, where the upper end is interconnected to the actuator output shaft and the lower end is positioned proximate to the valve stem; a stem nut interconnected to the valve stem and positioned proximate to the lower end of the shaft; and a union nut having a bore, where the union nut is interconnected to the lower end of the shaft, and where a portion of the valve stem, a portion of the stem nut, and a portion of the shaft are positioned within the bore of the union nut.

In further embodiments, the valve assembly further comprises a jam nut interconnected to the valve stem and positioned proximate an upper surface of the bushing. In some embodiments, the upper portion of the bushing has a width that is larger than a width of the lower portion of the bushing, the upper portion of the bushing has a hexagonal shape when viewed from a top plan view, and the lower portion of the bushing has a cylindrical shape, and the bushing has a threaded bore that threadingly engages a threaded portion of the valve stem. In one embodiment, the stem nut has a threaded bore that threadingly engages a threaded portion of the valve stem, the lower end of the shaft has at least one cut out and the stem nut has at least one protrusion that fit into the cut out of the shaft, the shaft of the housing assembly comprises a bore and at least an upper portion of the bore is threaded to threadingly engage a threaded portion of the actuator output shaft, and an outer surface of the lower end of the shaft is threaded and the bore of the union nut is threaded to threadingly engage the threaded outer surface of the lower end of the shaft. In some embodiments, the housing further comprises at least one transparent sidewall and a position indicator positioned within the housing and visible through the at least one transparent sidewall, and where when the valve is in a first position the plate aligns with a first portion of the position indicator and when the valve is in a second position the plate aligns with a second portion of the position indicator.

In one embodiment, a valve assembly for use in the oil and gas industry is provided comprising: an actuator with an actuator output shaft; a valve with a valve stem extending outwardly from an opening in an upper portion of the valve; a housing assembly interconnected on a lower end to the upper portion of the valve and interconnected on an upper end to a lower portion of the actuator, where the housing assembly comprises a yoke and one or more sidewalls; and an interconnection assembly comprising: a shaft having an upper end, a lower end, and a cylindrical body, where an outer diameter of the cylindrical body is larger than an outer diameter of the actuator output shaft and a diameter of the valve stem, where the upper end is interconnected to the actuator output shaft and the lower end is positioned proximate to the valve stem, and where an outer surface of the lower end of the shaft is threaded; a stem nut interconnected to the valve stem and positioned proximate to the lower end of the shaft; and a union nut having a threaded bore, where the union nut is threadingly engaged to the threaded outer surface of the lower end of the shaft, and where a portion of the valve stem and a portion of the stem nut are positioned within the bore of the union nut.

In further embodiments, the stem nut has a threaded bore that threadingly engages a threaded portion of the valve stem and the lower end of the shaft has at least one cut out and the stem nut has at least one protrusion that fit into the cut out of the shaft.

In some embodiments of the present invention, a method for manufacturing a valve assembly is provided. More specifically, a method for adapting an actuator to a valve is provided including separating the actuator from the yoke. Next, the yoke is interconnected to the valve using a nut, screw, washer, lock ring, or any other type of securing means known in the art. Additionally, the actuator extension shaft is modified by shortening the actuator extension shaft and machining the shaft end to match the end that was cut off of the shaft. Thus, the shortened end is machined to include threads and two notches to match the protrusions on the stem nut. The method further includes putting the spring and plate onto the valve stem using the new bushing. The main purpose of the plate is to compress the spring when power is added to a push-type valve assembly and to compress the spring when the power is off in pull-type actuators. The plate also indicates whether the valve is open or shut by lining up with indicator tags on the side of the yoke. Next, a bushing nut is screwed onto the valve stem and a jam nut is screwed onto the valve stem above the bushing nut. Then a union nut is placed on the valve stem and the stem nut is screwed onto the valve stem. The method further includes interconnecting the actuator extension shaft to the actuator output shaft. Then the union nut is screwed onto the actuator extension shaft with the stem nut. The method also includes pushing the union nut upward to interconnect the valve stem to the actuator extension shaft. The actuator head is bolted onto the yoke (also called a cage herein). Lastly, the acrylic sides of the housing assembly are interconnected and sealed to the yoke. Note that the steps of the method can be performed any order and still fall within the scope of the present invention.

In one embodiment, a method of providing a valve assembly is provided comprising: providing an actuator with an actuator output shaft; providing a valve with a valve stem extending outwardly from an opening in an upper portion of the valve; providing a housing assembly comprising a yoke and one or more sidewalls; providing an interconnection assembly comprising: a shaft having an upper end, a lower end, and a cylindrical body, where an outer diameter of the cylindrical body is larger than an outer diameter of the actuator output shaft and a diameter of the valve stem, where the upper end is interconnected to the actuator output shaft and the lower end is positioned proximate to the valve stem, and where an outer surface of the lower end of the shaft is threaded; a stem nut interconnected to the valve stem and positioned proximate to the lower end of the shaft; and a union nut having a threaded bore, where the union nut is threadingly engaged to the threaded outer surface of the lower end of the shaft, and where a portion of the valve stem and a portion of the stem nut are positioned within the bore of the union nut; interconnecting a lower portion of the housing assembly to the upper portion of the valve; and interconnecting an upper portion of the housing assembly to a lower portion of the actuator.

Devices and methods of embodiments of the present invention contemplate valve assemblies used in any field, but are typically used in the oil and gas industry.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more", and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

Figure 1A:
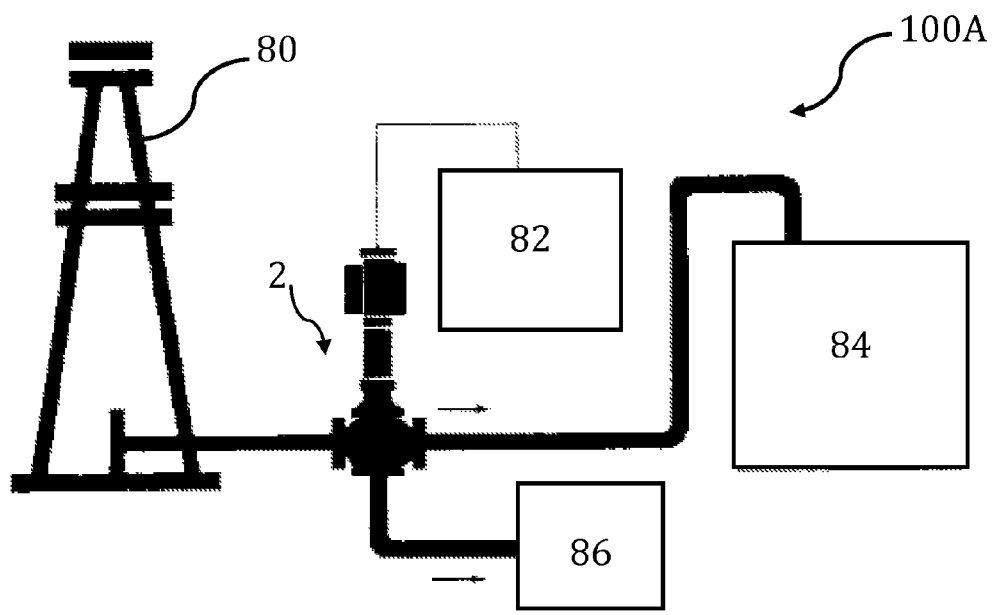
FIGS. 1A-C show embodiments of a system using a valve assembly.

To assist in the understanding of the embodiments of the present invention, the following list of components and associated numbering found in the drawings is provided herein:

No. Component Name
2 Valve Assembly
6 Actuator
8 Indicator
10 Housing Assembly
12a Indicator Tab
12b Indicator Tab
14 Valve
16 Cover Portion
18 Valve Stem
20 Threaded Portion of Valve Stem
22 Valve Mounting Bonnet
24 Spring Retainer Cup
26 Spring
30 Yoke
32a Inlet/Outlet
32b Inlet/Outlet
32c Inlet/Outlet
34 Spring Plate
38 Bushing
42 Jam Nut
44 Adapter Fitting
46 Union Nut
48 Actuator Output Shaft
50 Actuator Extension Shaft
52 Threaded Portion of Actuator Extension Shaft
54 Notch in Actuator Extension Shaft
56 Stem Nut
58 Upper End of Actuator Extension Shaft
60 Protrusion (or Ear) of Stem Nut
62 (Threaded) Bore of Stem Nut
70 Upper (Hexagonal) Portion of Bushing
74 Lower (Cylindrical) Portion of Bushing
78 (Threaded) Bore of Bushing
80 Oil and Gas Well
82 Programmer or Programming Equipment
84 Storage Tank/Device
86 Well Testing Equipment
88 Analyzer of Analyzing Equipment
90 Treatment Facility/Equipment
100A Well Testing System
100B Automatic Custody Transfer System
100C Tank Switching System
H1 Height of Upper Portion of Bushing
H2 Height of Lower Portion of Bushing
W1 Width of Upper Portion of Bushing
W2 Width of Lower Portion of Bushing
D1 Diameter of Lower Portion of Bushing
D2 Diameter of Bore of Bushing It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure.

The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1B:
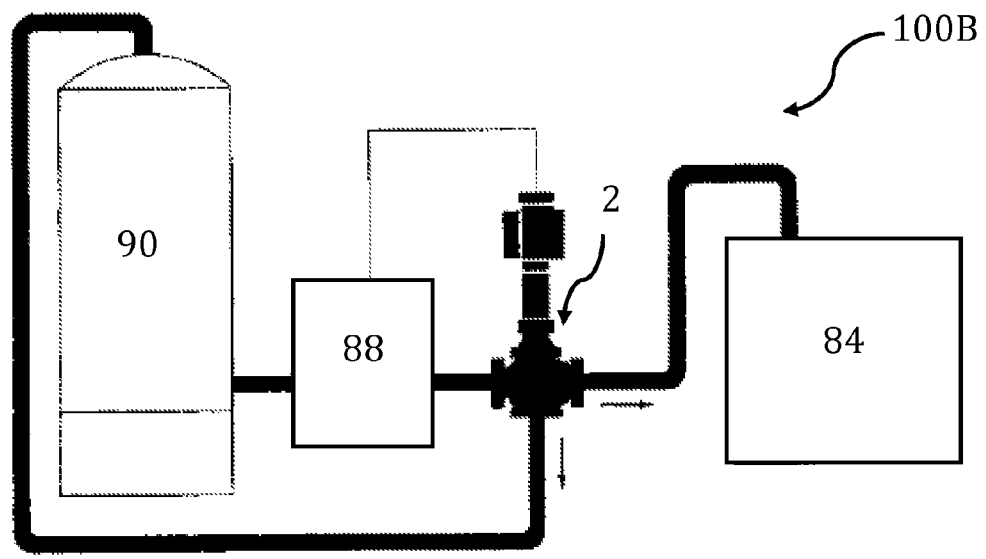
Figure 1C:
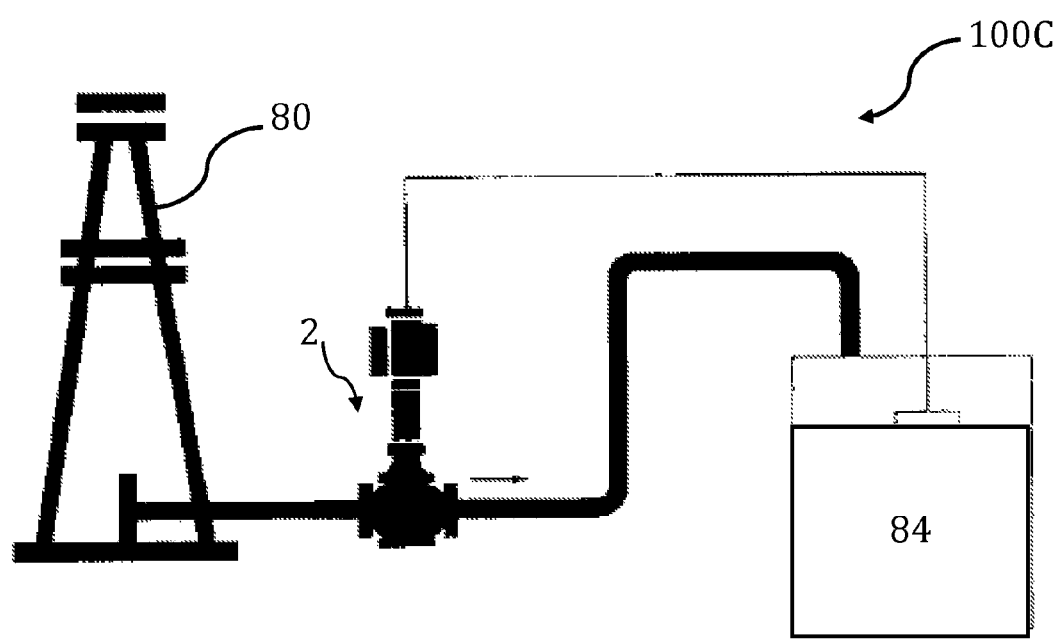

FIGS. 1A-C show how the valve assembly can be used in the oil and gas industry. The valve assembly 2 is primarily used in oil fields for well testing; well manifold systems; level control in storage tank switching; diverting service in Lease Automated Custody Transfer ("LACT") units; and for alternate pressure telemetering systems necessary to remote automatic supervision and control of pipelines. The valve assembly 2 is used to divert the flow of the oil and gas to different locations, e.g., to a well test, storage tank, and the treating facility. FIG. 1A shows a well testing system 100A comprising an oil and gas well 80, a valve assembly 2 directing the flow of oil and gas, a programming equipment 82, a well testing equipment 86, and a storage device 84. This system 100A samples the rate and quality of oil and gas flow on command or through programming equipment 82. FIG. 1B shows an automatic custody transfer system 100B comprising oil and gas treatment equipment 90, a valve assembly 2 directing the flow of oil and gas, an analyzer or analyzing equipment 88, and a storage device 84. This system 100B analyzes the oil and gas then diverts sub-quality oil or gas back to the treating process and equipment 90 as required. FIG. 1C shows a tank switching system 110C comprising an oil and gas well 80, a valve assembly 2, and a storage tanks 84 for storing the oil or gas. This system 100C controls the levels of oil or gas in the storage tank 84 by either opening the valve to allow oil or gas into the storage tank 84 or closing the valve to prevent oil or gas from entering the storage tank 84.

Figure 2:
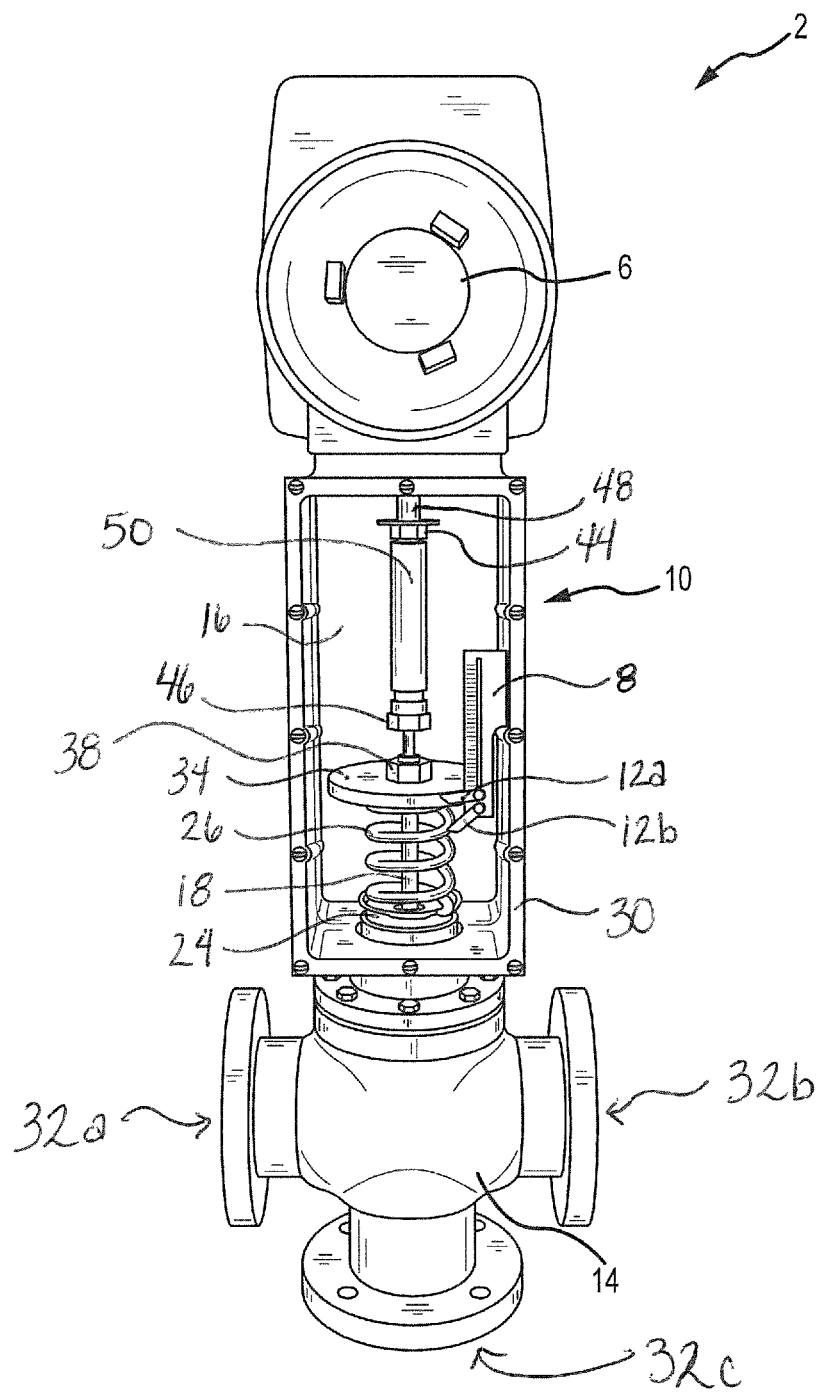
FIG. 2 shows one embodiment of a valve assembly.

FIG. 2 shows the front of one embodiment of a valve assembly 2. The valve assembly 2 includes an actuator 6, a housing assembly 10, and a valve 14. The actuator 6 includes an actuator output shaft 48. A motor in the actuator 6 moves the output shaft 48 up and down, which eventually moves the valve 14. More specifically, the output shaft 48 moves the valve stem 18, which changes the direction of the valve 14 and thus changes the direction fluid can flow through the valve 14. In one embodiment, the valve is three-way, two position valve. The valve body is typically cast iron, though other materials such as steel, ceramic, carbon fiber, and other known materials can be used.

The housing assembly 10 comprises a yoke 30, a cover portion 16, and an indicator 8 with one or more indicator tabs 12a, 12b. The yoke 30 provides structure for the housing assembly 10 and may be metal, plastic, carbon fiber, ceramic, or any other material used in the art. The cover portion 16 can be one piece that goes around the yoke 30 or can include four pieces, one for each side of the yoke 30. The cover portion 16 keeps dirt, water, and other debris out of the housing components. In some instances, the valve assembly 2 is positioned underground, thus, the housing assembly 10 is very important in that it keeps the internal components clean. The cover portions 16 can be glass, acrylic, Plexiglas, quartz, sapphire, or any other material known in the art. Additionally, depending on how far underground the valve assembly 2 is positioned, the housing 10 must be able to withstand large pressure forces. In some embodiments, the cover portion 16 is clear such that a user can see through the cover portion 16 to see the components within the housing assembly 10. If the cover portion 16 is transparent, then the housing assembly 10 may also include an indicator 8 (on the inside of the housing assembly 10) that indicates the position of the valve 14. For example, if the upper indicator tab 12a points at the top of the spring plate 34 (as shown in FIG. 2), then the valve 14 is in a first position. If the lower indicator tab 12b points to the spring plate 34, then the valve 14 is in a second position. In one embodiment when the valve is in the first position, the valve is shut, and when the valve is in the second position, the valve is open.

The upper portion of the housing assembly 10 is interconnected to a lower portion of the actuator. In some embodiments, the following components are contained within the housing assembly 10: a spring retainer cup 24, a spring 26, a spring plate 34 (also called an indicator plate), a portion of the valve stem 18, a bushing 38, a union nut 46, an actuator extension shaft 50, an adapter fitting 44, and a portion of an actuator output shaft 48. In general, a lower portion of the actuator output shaft 48 is interconnected to an upper portion of the actuator extension shaft 50 via the adapter fitting 44. A lower portion of the actuator extension shaft 50 is interconnected to an upper portion of the valve stem 18 via a union nut 46. A spring 26 is positioned around the valve stem 18 and the lower portion of the spring 26 is positioned in the spring retainer cup 24. The top of the spring 26 is interconnected to a spring plate 34. The bushing 38 is interconnected to the valve stem 18 and is positioned above the spring plate 34 to secure the spring plate 34 to the valve stem 18.

A lower portion of the housing assembly 10 is interconnected to an upper portion of the valve 14. In some embodiments, a lock ring is used to interconnect the yoke 30 to the valve 14. The housing assembly 10 may also be bolted onto an upper portion of the valve 14 in various embodiments. The valve 14 includes a valve stem 18 extending upwardly from an opening (not shown) in the upper portion of the valve 14. The valve 14 may be a two-way or a three-way valve. In the embodiment shown in FIG. 2, the valve 14 comprises three openings that can act as either inlets or outlets 32a, 32b, 32c. Pipe can be interconnected, via bolts or other interconnection mechanisms, to one or more inlets/outlets 32a, 32b, 32c. If piping is not interconnected to an inlet/outlet 32a, 32b, 32c, then the inlet/outlet should be closed off. The actuator 6 controls the valve 14. More specifically, the actuator 6 moves the actuator output shaft 48 (generally in an up and down motion), which moves the valve 14 from a valve first position to a valve second position (e.g., an open position to a closed position) and vice versa. Thus, the actuator output shaft 48 is interconnected to the valve 14. In some embodiments, the valve 14 comprises a valve stem 18 that is interconnected to the actuator 6. In further embodiments, the valve stem 18 is interconnected to the actuator output shaft 48. In still further embodiments, the valve stem 18 is interconnected to an actuator extension shaft 50, the actuator extension shaft 50 is interconnected to the actuator output shaft 48, and the actuator output shaft 48 is interconnected to the actuator 6. Accordingly, when the actuator 6 moves the actuator output shaft 48 up or down, the actuator output shaft 50 moves the actuator extension shaft 50 up or down, the actuator extension shaft 50 moves the valve stem 18 up or down, and the valve stem 18 moves internal components of the valve 14 to change the flow direction of fluid through the valve 14 or close the valve 14.

The valve assemblies 2 according to embodiments of the present invention differ from prior art valve assemblies in that embodiments of the present invention include different components and/or modified components. For example, the valve stem 18 is longer in some embodiments of the present invention, a bushing nut 38 replaces an adaptor, the actuator extension shaft 50 is shortened and machined differently to have a different shape and interconnection means, and a jam nut 42 is used in some embodiments of the present invention. The housing assembly 10 includes interconnection means to reduce the side-to-side movement of the actuator extension shaft 50, which in turn reduces the failure rate of the valve assembly 2.

Figure 3:
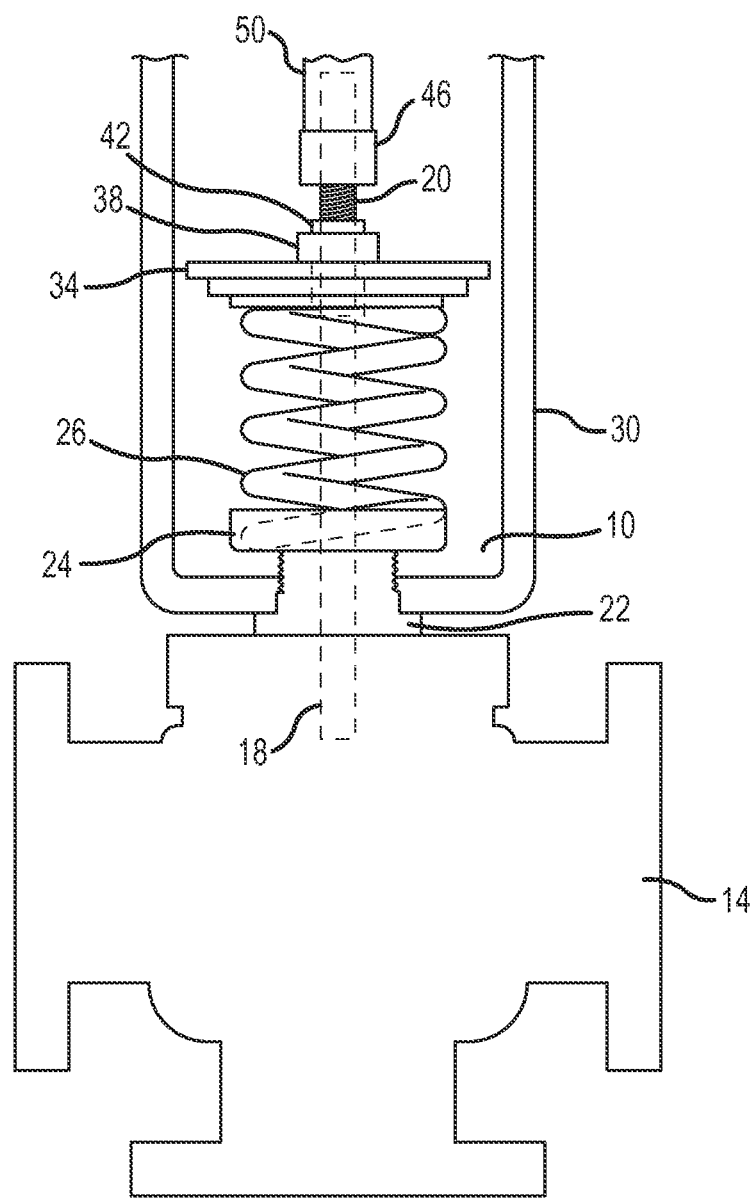
FIG. 3 is a sectional view of a portion of a valve assembly.

FIG. 3 is a sectional view of the lower portion of the valve assembly 2. This view shows the valve 14, the valve stem 18 extending outwardly from an upper portion of the valve 14, the housing assembly 10, the yoke 30, the valve mounting bonnet 22, the spring plate, the bushing 38, the jam nut 42, the threaded portion 20 of the valve stem, the union nut 46, and actuator extension shaft 50. The valve stem 18 is shown in phantom lines when it is hidden behind or within other components. In one embodiment, the valve 14 is interconnected to the yoke 30 via the valve mounting bonnet 22. The outer surface of the upper portion of the valve mounting bonnet 22 may be threaded and the yoke 30 may have an opening with a threaded inner surface such that the opening in the yoke 30 threadingly engages the threaded portion of the valve mounting bonnet 22. Alternatively, the valve mounting bonnet 30 may be welded, bonded, or interconnected via other known mechanisms to the housing assembly 10. The spring retainer cup 24 can have an opening to accommodate the valve stem 18 and a bottom surface of the spring retainer cup 24 can rest on a lower surface of the inside of the actuator housing assembly 10. Note that this lower surface of the inside of the actuator housing assembly 10 is also the upper surface of the bottom portion of the actuator housing assembly 10. In one embodiment, the bottom surface of the spring retainer cup 24 can rest on a lower surface of the inside of the yoke 30, and this surface is also the upper surface of the bottom portion of the yoke 30. In various embodiments, the force of the spring 26 can push the spring retainer cup 24 against the actuator housing assembly 10 or against the yoke 30 in one embodiment. Alternatively, the opening in the spring retainer cup 24 may be threaded to engage a threaded portion of the valve stem 18. Further, the spring 26 can be biased in a compressed state by the spring plate 34 pushing downwardly on the spring 26. The spring plate 34 can be secured in its position using the bushing 38 and jam nut 42, which are threadingly engaged with the valve stem and positioned above the spring plate 34 such that a lower surface of the bushing 38 engages an upper surface of the spring plate 34. Thus, the bushing 38 is screwed onto the valve stem 18 to secure the indicator plate 34 onto the valve stem 18. In some embodiments, the stem nut 56 (not shown, see FIG. 3) has a threaded bore 62 that threadingly engages the threads of the valve stem 18. In some embodiments, the union nut 46 has a threaded bore that threadingly engages the threads 52 of the actuator extension shaft 50 (not shown, see FIG. 3). The union nut 46 assists in the interconnection of the actuator extension shaft 50 to the valve stem 18 such that the actuator extension shaft 50 is securely positioned on the valve stem 18. Thus, in some embodiments, the union nut 46 is positioned proximate to a lower surface of the actuator extension shaft 50 and positioned proximate to the stem nut 56 (not shown, see FIG. 3). More specifically, the union nut 46 is positioned around the valve stem 18, stem nut 56, and a lower portion of the actuator extension shaft 50 to protect the interconnection between the actuator extension shaft 50 and the valve stem 18 and to strengthen that interconnection.

Figure 4:
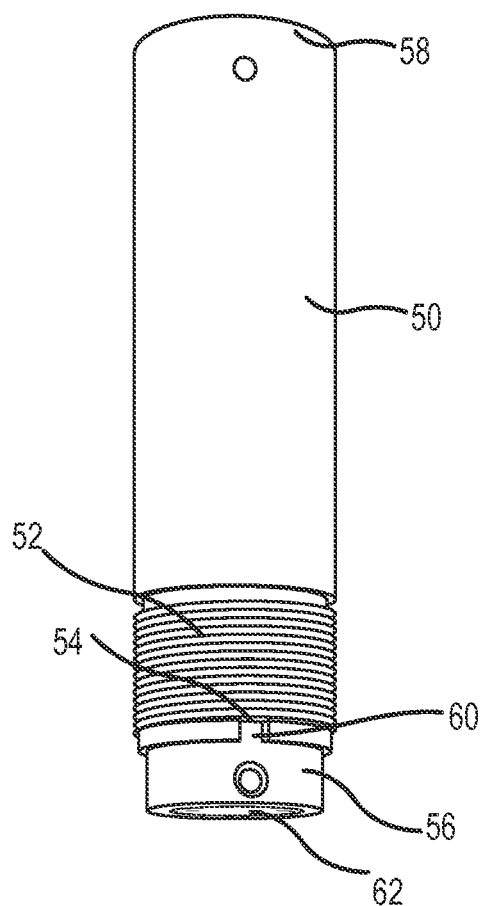
FIG. 4 shows one embodiment of an actuator extension shaft and stem nut.

FIG. 4 shows the stem nut 56 in alignment with the actuator extension shaft 50. The actuator extension shaft 50 comprises a threaded portion 52 on a lower end, at least one notch 54 on the lower end, a shaft body, and an upper end 58. The stem nut 56 comprises at least one protrusion 60 (also called an ear herein) that fits into the at least one notch 54 of the actuator extension shaft 50. In another embodiment, the actuator extension shaft 50 comprises two notches 54 positioned opposite one another, and the two notches 54 align with two protrusions 60 of the stem nut 56. The stem nut 56 has a bore 62 and the bore 62 can be threaded to threadingly engage a threaded portion of the valve stem. In some embodiments, the actuator extension shaft 50 has been shortened as compared to prior art shafts.

Figure 5:
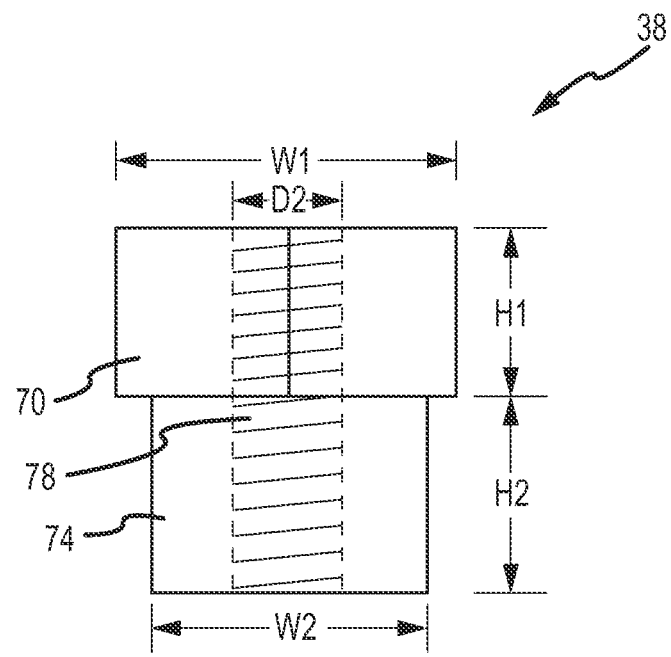
FIG. 5 is a side elevation view of one embodiment of a bushing.
Figure 6:
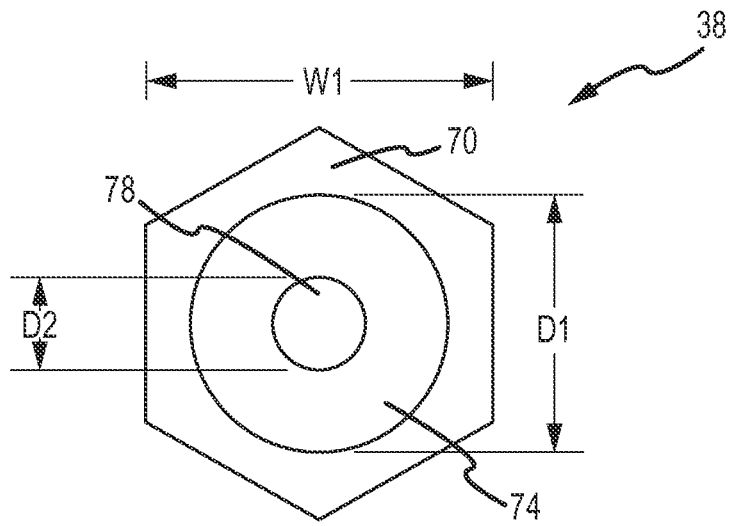
FIG. 6 is a bottom plan view of the bushing of FIG. 5.

FIG. 5 is drawing of the side elevation view of the bushing 38. FIG. 6 is a drawing of the bottom plan view of the bushing 38. The bushing 38 comprises an upper portion 70, a lower portion 74, and a bore 78 (shown in phantom). In some embodiments, the bushing 38 is a hex bushing, meaning the upper portion 70 has a hexagonal shape when viewed from a top plan view or a bottom plan view, and the lower portion 74 has a cylindrical shape. The bore 78 is threaded in some embodiments. The bore 78 is positioned along the longitudinal axis of the bushing 38 and is positioned in the center of the bushing 38.

In one embodiment, the width W1 of the upper portion 70 is between about 1.0 inches and about 3.0 inches. In a preferred embodiment, the width W1 of the upper portion 70 is between about 1.2 inches and about 2.0 inches. In a more preferred embodiment, the width W1 of the upper portion 70 is about 1.375 inches. In one embodiment, the width W2 of the lower portion 74 is between about 0.75 inches and about 2.0 inches. In a preferred embodiment, the width W2 of the lower portion 74 is between about 1.0 inches and about 1.5 inches. In a more preferred embodiment, the width W2 of the lower portion 74 is about 1.125 inches. If the lower portion 74 of the bushing 38 is cylindrical, then the width W2 of the lower portion 74 will equal the outer diameter D1 of the lower portion 74. In one embodiment, the height H1 of the upper portion 70 is between about 0.25 inches and about 2.0 inches. In a preferred embodiment, the height H1 of the upper portion 70 is between about 0.50 inches and about 1.0 inches. In a more preferred embodiment, the height H1 of the upper portion 70 is about 0.625 inches. In one embodiment, the height H2 of the lower portion 74 is between about 0.25 inches and about 2.0 inches. In a preferred embodiment, the height H2 of the lower portion 74 is between about 0.50 inches and about 1.0 inches. In a more preferred embodiment, the height H2 of the lower portion 74 is about 0.75 inches. In one embodiment, the diameter D2 of the bore 78 is between about 0.25 inches and about 1.0 inches. In a preferred embodiment, the diameter D2 of the bore 78 is between about 0.40 inches and about 0.75 inches. In a more preferred embodiment, the diameter D2 of the bore 78 is about 0.4375 (7/16) inches.

Various valves can be used and are known in the art. For example, in one embodiment, the valve is manufactured by Pathway Controls, Inc. In one embodiment the valve comprises a body, a valve stem, a lock ring, an adapter sleeve, a yoke adapter, screws, lock pins, O-rings, a cage, a plug retainer, an upper seat, a plug spacer, a plug, a lower seat, and a lock nut. In some embodiments, the valve further comprises a valve bonnet and a packing gland, which is the space around a valve stem as the valve stem rises out of the top part of the valve or out of the valve bonnet.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A valve assembly for use in the oil and gas industry, comprising:
   an actuator with an actuator output shaft;
   a valve with a valve stem extending outwardly from an opening in an upper portion of the valve; and
   a housing assembly interconnected on a lower end to the upper portion of the valve and interconnected on an upper end to a lower portion of the actuator, wherein the housing assembly comprises:
   a yoke;
   a spring having an outer diameter;
   a plate including a bore positioned proximate a center of the plate, wherein the plate has an outer diameter that is larger than the outer diameter of the spring;
   a bushing interconnected to the valve stem, the bushing having an upper portion positioned above the plate and having a lower portion, wherein at least a portion of the lower portion of the bushing is positioned within the bore of the plate;
   a shaft having an upper end, a lower end, and a body, wherein an outer diameter of the body is larger than an outer diameter of the actuator output shaft and a diameter of the valve stem, wherein the upper end is interconnected to the actuator output shaft and the lower end is positioned proximate to the valve stem;
   a stem nut interconnected to the valve stem and positioned proximate to the lower end of the shaft;
   a union nut having a bore, wherein the union nut is interconnected to the lower end of the shaft, and wherein a portion of the valve stem, a portion of the stem nut, and a portion of the shaft are positioned within the bore of the union nut; and
   wherein the bushing has a threaded bore that threadingly engages a threaded portion of the valve stem.

2. The valve assembly of claim 1 further comprising a jam nut interconnected to the valve stem and positioned proximate an upper surface of the bushing.

3. The valve assembly of claim 1, wherein the upper portion of the bushing has a width that is larger than a width of the lower portion of the bushing.

4. The valve assembly of claim 1, wherein the upper portion of the bushing has a hexagonal shape when viewed from a top plan view, and the lower portion of the bushing has a cylindrical shape.

5. The valve assembly of claim 1, wherein the stem nut has a threaded bore that threadingly engages a threaded portion of the valve stem.

6. The valve assembly of claim 1, wherein the shaft of the housing assembly comprises a bore and at least an upper portion of the bore is threaded to threadingly engage a threaded portion of the actuator output shaft.

7. The valve assembly of claim 1, wherein an outer surface of the lower end of the shaft is threaded and the bore of the union nut is threaded to threadingly engage the threaded outer surface of the lower end of the shaft.

8. The valve assembly of claim 1, wherein the housing further comprises at least one transparent sidewall and a position indicator positioned within the housing and visible through the at least one transparent sidewall, and wherein when the valve is in a first position the plate aligns with a first portion of the position indicator and when the valve is in a second position the plate aligns with a second portion of the position indicator.

9. A valve assembly for use in the oil and gas industry, comprising:
   an actuator with an actuator output shaft;
   a valve with a valve stem extending outwardly from an opening in an upper portion of the valve; and
   a housing assembly interconnected on a lower end to the upper portion of the valve and interconnected on an upper end to a lower portion of the actuator, wherein the housing assembly comprises:
   a yoke;
   a spring having an outer diameter;
   a plate including a bore positioned proximate a center of the plate, wherein the plate has an outer diameter that is larger than the outer diameter of the spring;
   a bushing interconnected to the valve stem, the bushing having an upper portion positioned above the plate and having a lower portion, wherein at least a portion of the lower portion of the bushing is positioned within the bore of the plate;
   a shaft having an upper end, a lower end, and a body, wherein an outer diameter of the body is larger than an outer diameter of the actuator output shaft and a diameter of the valve stem, wherein the upper end is interconnected to the actuator output shaft and the lower end is positioned proximate to the valve stem;
   a stem nut interconnected to the valve stem and positioned proximate to the lower end of the shaft;
   a union nut having a bore, wherein the union nut is interconnected to the lower end of the shaft, and wherein a portion of the valve stem, a portion of the stem nut, and a portion of the shaft are positioned within the bore of the union nut; and
   wherein the lower end of the shaft has at least one cut out and the stem nut has at least one protrusion that fit into the cut out of the shaft.

10. The valve assembly of claim 9, further comprising a jam nut interconnected to the valve stem and positioned proximate an upper surface of the bushing.

11. The valve assembly of claim 9, wherein the upper portion of the bushing has a width that is larger than a width of the lower portion of the bushing.

12. The valve assembly of claim 9, wherein the upper portion of the bushing has a hexagonal shape when viewed from a top plan view, and the lower portion of the bushing has a cylindrical shape.

13. The valve assembly of claim 9, wherein the stem nut has a threaded bore that threadingly engages a threaded portion of the valve stem.

14. The valve assembly of claim 9, wherein the shaft of the housing assembly comprises a bore and at least an upper portion of the bore is threaded to threadingly engage a threaded portion of the actuator output shaft.

15. The valve assembly of claim 9, wherein an outer surface of the lower end of the shaft is threaded and the bore of the union nut is threaded to threadingly engage the threaded outer surface of the lower end of the shaft.

16. The valve assembly of claim 9, wherein the housing further comprises at least one transparent sidewall and a position indicator positioned within the housing and visible through the at least one transparent sidewall, and wherein when the valve is in a first position the plate aligns with a first portion of the position indicator and when the valve is in a second position the plate aligns with a second portion of the position indicator.

17. A valve assembly for use in the oil and gas industry, comprising:
  an actuator with an actuator output shaft;
  a valve with a valve stem extending outwardly from an opening in an upper portion of the valve;
  a housing assembly interconnected on a lower end to the upper portion of the valve and interconnected on an upper end to a lower portion of the actuator, wherein the housing assembly comprises a yoke and one or more sidewalls; and
  an interconnection assembly comprising:
    a shaft having an upper end, a lower end, and a cylindrical body, wherein an outer diameter of the cylindrical body is larger than an outer diameter of the actuator output shaft and a diameter of the valve stem, wherein the upper end is interconnected to the actuator output shaft and the lower end is positioned proximate to the valve stem, and wherein an outer surface of the lower end of the shaft is threaded;
    a stem nut interconnected to the valve stem and positioned proximate to the lower end of the shaft;
    a union nut having a threaded bore, wherein the union nut is threadingly engaged to the threaded outer surface of the lower end of the shaft, and wherein a portion of the valve stem and a portion of the stem nut are positioned within the bore of the union nut;
  wherein the lower end of the shaft has at least one cut out and the stem nut has at least one protrusion that fit into the cut out of the shaft.

18. The valve assembly of claim 17, wherein the stem nut has a threaded bore that threadingly engages a threaded portion of the valve stem.

19. The valve assembly of claim 17, further comprising a bushing interconnected to the valve stem, wherein the bushing has a threaded bore that threadingly engages a threaded portion of the valve stem.

* * * * *